United States Patent [19]

Ringness

[11] 4,220,216
[45] Sep. 2, 1980

[54] WELD JOINT HARDBAR MAIN FRAME

[75] Inventor: Robert F. Ringness, Peoria, Ill.
[73] Assignee: Caterpillar Tractor Co., Peoria, Ill.
[21] Appl. No.: 14,017
[22] Filed: Feb. 2, 1979
[51] Int. Cl.² .................................................. B62D 55/00
[52] U.S. Cl. ...................................................... 180/9.5
[58] Field of Search .................... 180/9.2, 9.5, 9.52, 180/9.54, 9.56, 9.58, 9.6

[56] References Cited
U.S. PATENT DOCUMENTS
4,083,459   4/1978   Allen ..................................... 212/8 B

*Primary Examiner*—John J. Love
*Assistant Examiner*—John A. Carroll
*Attorney, Agent, or Firm*—Wegner, Stellman, McCord, Wiles & Wood

[57] ABSTRACT

In a crawler vehicle (10), a support bar (25) to main frame (12) connection is provided which has adequate shear strength and flexibility. The support bar (25) is shaped (50) in line with the main frame beams (38,40) so that the main frame beams (38,40) seat therein. The junctions between the support bar (25) and main frame beams (38,40) are welded (54,56) together. Angled plates (60) are fitted between each side (46,48) of each main frame beams (38,40) and the support bar (25), which angled plates (60) are welded (68) to the beams (38,40) and to the hardbar (25). The angled plates (60) bridge (66) the longitudinal welds (54) between the support bar (25) and the beams (38,40) of the main frame (12) to lend some flexibility to the junction therebetween.

9 Claims, 4 Drawing Figures

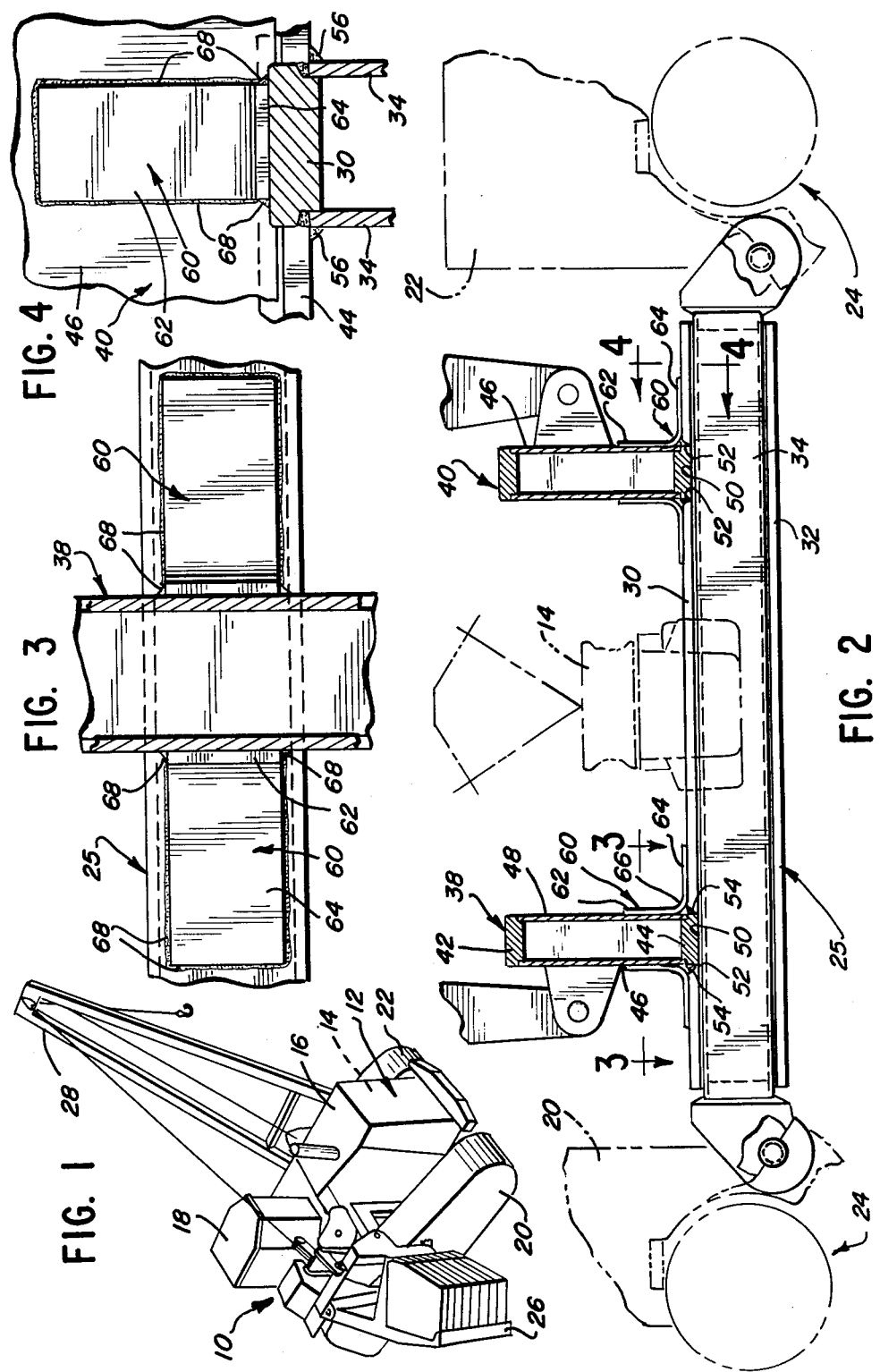

WELD JOINT HARDBAR MAIN FRAME

DESCRIPTION

TECHNICAL FIELD

This invention relates to vehicles and, more particularly, to the connection of a support bar to a main frame of said vehicle.

BACKGROUND ART

Crawler-type vehicles that are used for special applications, such as pipelayers, and the like, have traditionally used a support bar connected to the main frame of the vehicle with the track assemblies connected to the opposite ends of the support bar. One such vehicle has used very massive support bars that extend up the sides of the main frame which, due to the massiveness of the support bars, add considerable weight and, it was found, provide unnecessary support. Another current version of the connection of the support bar to the main frame makes use of bolts for securing the support bar to the main frame. In this particular case, the bolts may loosen.

One fairly recent concept for attaching the support bar to the main frame uses welds between the top of the support bar and the bottom corners of the beams of the main frame with the top of the support bar being flush with the bottom of the beams. Since the welds are the sole connection between the support bar and the beams, stresses in the beams or the support bar caused by the welds or the welds themselves may fracture.

DISCLOSURE OF INVENTION

A stable support bar to main frame connection is provided which has adequate shear strength between the support bar and the main frame, has an adequate degree of flexibility therebetween, and yet is relatively simple and easy to fabricate. The beams of the main frame rest in longitudinal grooves or indents in the top of the support bar. Longitudinal welds extend between the walls of the groove and the side of each beam. In addition, a transverse weld extends between the lower face of the beams and the support bar. Angled plates having two straps joined at substantially right angles to each other are welded to the top of the support bar and to the sides of each beam. The junction between the two straps of each angled plate is such as to bridge the weld between the beam and the adjacent wall of the groove or indent in the support bar.

With the beams of the frame welded to the support bar and with the angled plates welded between the beams and the support bar, the size of the support bar may be reduced and its configuration may remain simple. The angled plates of the design, when combined with the welds between the walls of the grooves and the beams, provide the necessary shear strength and flexibility for the connection.

BRIEF DESCRIPTION OF THE DRAWINGS

FIG. 1 is a perspective view of a pipelayer on which the improved support bar to main frame connection is employed;

FIG. 2 is a cross-sectional view taken transverse to the longitudinal axis of the vehicle just forward of the mounting of the support bar to the main frame;

FIG. 3 is an enlarged cross-sectional view taken along the lines 3—3 of FIG. 2; and, FIG. 4 is an enlarged cross-sectional view taken along the lines 4—4 of FIG. 2.

BEST MODE FOR CARRYING OUT THE INVENTION

Referring to FIG. 1, and to some extent to FIG. 2, a crawler-type vehicle 10, in this instance a pipelayer, includes a main frame 12 upon which is supported an engine 14, enclosed in a housing 16, and a cab 18. A pair of track assemblies 20 and 22 are disposed on opposite sides of the main frame 12. Each track assembly 20,22 includes a roller frame 24 (FIG. 2), which frames 24 are interconnected through a laterally extending support bar or hardbar 25. The details of the connection of the support bar 25 to the track assemblies 20,22 does not form a part of this invention.

As illustrated in FIG. 1, the particular vehicle here involved is a pipelayer and has a counterweight assembly 26 mounted on one side thereof and has a boom assembly 28 disposed on the opposite side of the vehicle 10. A typical counterweight and boom assembly are shown and described in detail in U.S. Pat. No. 4,083,459, issued Apr. 11, 1978 to Jan K. Allen and assigned to Caterpillar Tractor Co., the common assignee of the present invention.

The support bar 25 is a structural member comprised of a top plate 30, shown in FIGS. 2 and 4, and a comparable bottom plate 32, as shown in FIG. 2. Side plates 34 are welded to recessed edges of the top and bottom plates 30 and 32, respectively, to form a rigid structural member or support bar 25. The track roller frames 24 are secured to the ends of the support bar 25 in a conventional manner. As illustrated, a protrusion on each roller frame 24 nests in the open ends of the support bar 25 and are secured therein as by welding, or the like.

The main frame 12 of the vehicle 10 is characterized by a pair of longitudinally extending beams 38 and 40 which traverse the length of the vehicle 10 and lie substantially parallel to the longitudinal axis of the vehicle. The beams 38 and 40 are comprised of top and bottom plates 42 and 44, respectively, and side plates 46 and 48, which are welded to the top and bottom plates 42,44 to form the rigid support structure or beams 38,40. The support bar 25 has grooves or indents 50 formed in the top plate 30, which indents or grooves 50 are spaced apart a distance coinciding with the spacing of the beams 38 and 40 and have an axial length relative to the support bar 25 of a sufficient magnitude as to permit the bottom plates 44 of the beams 38 and 40 to nest down therein. The bottom plates 44 of the beams 38 and 40 bottom on the base of the groove or indent 50 with the tapered walls 52 of the groove 50 converging toward the lower corners of the bottom plate 44 when the support bar 25 is in position with respect to the beams 38 and 40.

A longitudinal groove weld or fillet 54 is applied between the tapered walls 52 of the groove 50 and the sides of the beams whereby the top plate 30 of the support bar 25 is initially attached to the bottom plates 44 of the beams 38 and 40. A transverse weld 56 (FIG. 4) is made between the lower face of the main frame beams 38,40 and the support bar 25 on opposite sides of the support bar 25 to further secure the support bar 25 to the beams.

Angled plates 60 are provided between each side of the beams 38 and 40 and the top of the support bar 25. Specifically, each angled plate 60 has a pair of strap portions 62 and 64 joined together by an arcuate corner 66 such that the strap portions 62 and 64 are substantially at right angles to each other. Each plate 60 is nested against one side of a beam 38 or 40 and against the top of the top plate 30 of the support bar 25 and is welded at 68 to the side of the beam 38 or 40 and to the top of the support bar 25 along the outer edges of each strap 62,64. The curvature of the corner 66 between the strap portions 62 and 64 is such that it will bridge the longitudinal weld 54 between the groove 50 in the support bar 25 and the beam 38 or 40 so as to permit some flexing between the frame 12 and the support bar 25.

The combined attachment of the support bar 25 directly to the bottom plates 44 of the beams 38 and 40 and the shear and stress support provided by the pair of angled plates 60 on each side of the main frame beams 38 and 40 provides sufficient shear strength to the connection and still allows a degree of flexibility between the main frame 12 and the support bar 25 as is needed for long term, trouble free operation. The support bar to main frame beams connection is such that adequate strength is provided even though the size of the support bar 25 has been substantially reduced, all without creating any problems in the long term use and operation of the device.

I claim:

1. A welded frame support structure, comprising:
a support member (25) having a top surface (30),
a frame member (38,40) engaging said top surface (30) of said support member (25) and extending at substantially right angles to said support member (25),
welds (54) between said support member (25) and frame member (38,40), and;
flexible plate means (60) attached to the side of said frame member (38,40) and said top surface (30) of said support member (25) and positioned such that said flexible plate means (60) bridges said weld between said support member (25) and frame member (38,40) and having no weld between said flexible plate means (60) and support member (25) and frame member (38,40) along said bridged portion.

2. A structure as set forth in claim 1 wherein said support member (25) has seating means (50) formed in said top surface (30) in alignment with said frame member (38,40).

3. In a support structure as claimed in claim 2 wherein each said seating means (50) is a groove (50) having walls (52) angled downward and inward toward the base of said groove (50).

4. In a support structure as claimed in claim 1 wherein said plate means (60) is an angled plate having two straps (62,64) extending at right angles to each other, one of said straps (62) of said plate (60) lying flat against the side of said frame member (38,40) with the other of said straps (64) of said plate (60) lying flat against the top surface (30) of said support member (25).

5. In a support structure as claimed in claim 2 wherein the junction (66) between said straps (62,64) of each angled plate (60) is such that it bridges the weld (54) between the frame member (38,40) and the support member (25).

6. In a support structure as claimed in claim 5 wherein said welds (54,56) between said support member (25) and said frame member (38,40) are longitudinal welds (54) and transverse welds (56), said longitudinal welds (54) are formed between the walls (52) of said grooves (50) and the sides (46,48) of said frame member (38,40) and said transverse welds (56) are formed between the bottom wall (44) of said frame member (38,40) and the sides (34) of said support member (25).

7. In a vehicle (10) having a main frame (12) extending along a longitudinal axis, said main frame (12) having at least two spaced apart longitudinally extending beams (38,40), first and second track assemblies (20,22) disposed on opposite sides of said main frame (12), a support bar (25) connected to said first and second track assemblies (20,22) and extending transverse to said spaced apart beams (38,40), the improvement comprising the connection between said support bar (25) and said spaced apart beams (38,40), said support bar (25) having seating means (50) in a top surface (30) in alignment with said beams (38,40) into which said beams (38,40) nest, welds (54) extending between said support bar (25) and each of said beams (38,40), a pair of flexible plates (60,60) with each flexible plate (60) engaging both the beam (38,40) and the support bar (25) and positioned to bridge (66) said welds (54) between said support bar (25) and each of said beams (38,40), and welds (68) extending between each flexible plate (60) and the associated beam (38,40) and the support bar (25) whereby no welds are positioned in the bridging portion (66) of said flexible plates (60,60).

8. In a vehicle (10) as claimed in claim 7 wherein each said seating means (50) is a groove (50) having walls (52) angled downward and inward toward the base of said groove (50).

9. In a support bar (25) connection to a main frame (12) of a vehicle, wherein said main frame (12) has at least two spaced apart longitudinally extending beams (38,40), the improvement comprising extending the support bar (25) transverse to said spaced apart beams (38,40), said support bar (25) having seating means (50) in a top surface (30) in alignment with said beams (38,40) into which seating means (50) said beams (38,40) nest, welds (54,56) extending between said support bar (25) and each of said beams (38,40), a pair of flexible plates (60) located on opposite sides (46,48) of each beam (38,40) with each flexible plate (60) engaging both the beam (38,40) and the support bar (25), and welds (68) extending between each flexible plate (60) and the associated beam (38,40) and the support bar (25) whereby the support bar (25) is securely fastened to the frame member.

* * * * *